J. W. MELCHER.
Whiffletree.
No. 70,348.
Patented Oct. 29, 1867.
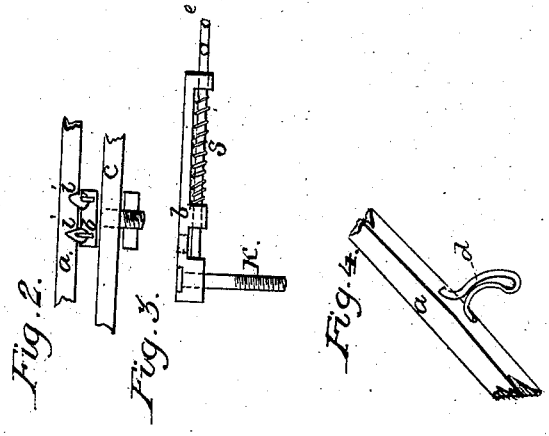
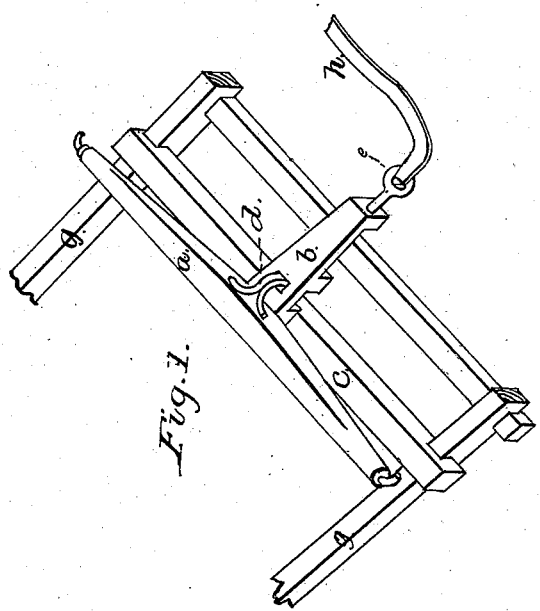
WITNESSES:
INVENTOR:

United States Patent Office.

JOHN W. MELCHER, OF OSHKOSH, WISCONSIN, ASSIGNOR TO HIMSELF AND JOHN J. SPRAGUE, OF THE SAME PLACE.

Letters Patent No. 70,348, dated October 29, 1867.

IMPROVEMENT IN DETACHABLE WHIFFLE-TREE.

*The Schedule referred to in these Letters Patent and making part of the same.*

TO ALL WHOM IT MAY CONCERN:

Be it known that I, JOHN W. MELCHER, of the city of Oshkosh, State of Wisconsin, have invented a new and improved Detachable Whiffle-Tree; and I do hereby declare that the following is a full and exact description thereof, reference being had to the accompanying drawings, and to the letters of reference marked thereon, making a part of this specification, in which—

Figure 1 is a perspective view.

Figure 2 is a front view of cross-bar and whiffle-tree and attachments.

Figure 3 is a longitudinal view of the intermediate connection between whiffle-tree and cross-bar.

Figure 4 is a fragment of whiffle-tree and detachable hook.

$g\ g$ are fragments of the fills, $c$ is a cross-bar, $b$ is the intermediate connection between cross-bar and whiffle-tree, and has a mortised opening in the top, a swivel screw-bolt, $k$, and spring-bolt $e$, which is actuated by coil spring $s$ and strap $h$. $a$ is the whiffle-tree, with a hinged attachment in front to the intermediate connection $b$ at $i\ i$, and detachable hook $d$ on the back side.

This is a device to be used in case of the running away of the horse, or as other circumstances may necessitate, for detaching the tugs or traces from the whiffle-tree instantaneously, and, with the breeching or hold-back straps secured in spring hooks, or other known appliances, enables the animal to free itself from the vehicle by the forward draught.

The invention consists in hinging the whiffle-tree at the bottom front centre to an intermediate connection between itself and the cross-bar, and thence runs back at right angles to the whiffle-tree. The connection $b$ in turn is secured to the cross-bar by a swivel screw-bolt, $k$. On the back side of the whiffle-tree, opposite the hinged connection, is a hook, with an eye in the point, which drops down at right angles to whiffle-tree, and in ordinary use enters the mortise in the intermediate connection, and is there secured by a spring-bolt locking into it. The spring-bolt is provided with a strap looped in the outer end, and from thence passes under the body of the vehicle, and up through the bottom convenient for use, where, by a firm pull on the strap, the spring-bolt is drawn back, the hook released, and the forward draught would reverse the whiffle-tree, the tugs be unhitched, and the animal would become disengaged, as before described.

What I claim as my invention, and desire to secure by Letters Patent, is—

The intermediate connection $b$, the spring-bolt $e$, detachable hook $d$, hinged attachment $i\ i$, and swivel-bolt $k$, when arranged relatively to each other and to the whiffle-tree $a$ and cross-bar $c$, substantially as described for the purposes set forth.

JOHN W. MELCHER.

Witnesses.
W. G. RITCH,
R. B. KELLOGG.